US009727971B2

(12) United States Patent
Qiao et al.

(10) Patent No.: US 9,727,971 B2
(45) Date of Patent: Aug. 8, 2017

(54) METHOD AND SYSTEM FOR UPDATING BACKGROUND MODEL BASED ON DEPTH

(71) Applicants: Gang Qiao, Beijing (CN); Xin Wang, Beijing (CN); Shengyin Fan, Beijing (CN); Qian Wang, Beijing (CN); Jiadan Zhu, Beijing (CN)

(72) Inventors: Gang Qiao, Beijing (CN); Xin Wang, Beijing (CN); Shengyin Fan, Beijing (CN); Qian Wang, Beijing (CN); Jiadan Zhu, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 134 days.

(21) Appl. No.: 14/740,641

(22) Filed: Jun. 16, 2015

(65) Prior Publication Data
US 2015/0371398 A1 Dec. 24, 2015

(30) Foreign Application Priority Data

Jun. 23, 2014 (CN) .......................... 2014 1 0283056

(51) Int. Cl.
*G06K 9/00* (2006.01)
*G06T 7/00* (2017.01)
(Continued)

(52) U.S. Cl.
CPC .............. *G06T 7/0081* (2013.01); *G06T 7/11* (2017.01); *G06T 7/174* (2017.01); *G06T 7/194* (2017.01);
(Continued)

(58) Field of Classification Search
CPC ....... G06T 2207/20144; G06T 2200/28; G06T 7/0075; G06T 7/0077; G06T 7/2033;
(Continued)

(56) References Cited

U.S. PATENT DOCUMENTS 6,532,022 B1 * 3/2003 Ahmad ................... G06T 5/008
345/629
6,658,136 B1 * 12/2003 Brumitt .............. G06K 9/00771
382/103

(Continued)

*Primary Examiner* — Vu Le
*Assistant Examiner* — Aklilu Woldemariam
(74) *Attorney, Agent, or Firm* — Oblon, McClelland, Maier & Neustadt, L.L.P.

(57) ABSTRACT

A method and a system for updating a background model based on depth are disclosed. The method includes receiving, in response to the occurrence of a predetermined background updating condition, one or more depth images captured after a time when the predetermined background updating condition occurs; obtaining, based on an original background model, foreground images in the one or more captured depth images, which are newly added compared with a depth image at the time when the predetermined background updating condition occurs; for each of foreground pixels in each of the newly added foreground images, comparing a current depth value with a previous depth value before the time when the predetermined background updating condition occurs; and updating, when the current depth value is greater than the previous depth value, the original background model as the updated background model by using the foreground pixel in the newly added foreground image.

10 Claims, 5 Drawing Sheets

(51) Int. Cl.
*G06T 7/11* (2017.01)
*G06T 7/174* (2017.01)
*G06T 7/194* (2017.01)
*H04N 13/02* (2006.01)

(52) U.S. Cl.
CPC ...... *G06K 9/00* (2013.01); *G06T 2207/10021* (2013.01); *G06T 2207/10028* (2013.01); *G06T 2207/20224* (2013.01); *H04N 13/0239* (2013.01)

(58) Field of Classification Search
CPC ..... G06T 7/2053; G06T 7/0081; G06T 15/00; G06T 2207/10016; G06T 7/0042; G06T 7/204; G06T 2207/10028; G06T 7/004; G06T 7/2086; G06T 2207/20224; G06T 2207/30196; G06T 7/2006; G06T 2207/10021; G06T 2207/30241; G06T 7/11; G06T 7/174; G06T 7/194; G06T 7/248; G06T 7/277; G06T 7/285; G06T 7/593; G06T 7/74; G06T 7/90; G06T 7/20; G06K 9/00362; G06K 9/00624; G06K 9/00771; G06K 9/00369; G06K 9/6289; G06K 9/6296; G06K 9/00208; G06K 9/00355; G06K 9/00201; G06K 9/00375; H04N 13/0239; H04N 13/0242; H04N 2013/0085; H04N 5/2351; H04N 13/0003; H04N 2213/003; G08B 13/19608
USPC ....... 382/103, 154, 159, 173, 199, 218, 165; 348/43, 47, 169, 701
See application file for complete search history.

(56) References Cited

U.S. PATENT DOCUMENTS

| | | | | |
|---|---|---|---|---|
| 6,999,620 | B1* | 2/2006 | Harville | G06K 9/00624 382/103 |
| 8,073,197 | B2* | 12/2011 | Xu | G06K 9/00771 348/169 |
| 8,208,733 | B2 | 6/2012 | Park | |
| 8,218,818 | B2* | 7/2012 | Cobb | G06K 9/00771 382/103 |
| 8,818,028 | B2* | 8/2014 | Nguyen | H04N 5/272 382/103 |
| 2005/0276446 | A1* | 12/2005 | Chen | G06K 9/00771 382/103 |
| 2008/0166045 | A1* | 7/2008 | Xu | G06K 9/00771 382/170 |
| 2011/0142289 | A1* | 6/2011 | Barenbrug | G06T 7/136 382/107 |
| 2011/0242277 | A1* | 10/2011 | Do | H04N 5/272 348/43 |
| 2011/0293137 | A1* | 12/2011 | Gurman | G06K 9/00201 382/103 |
| 2013/0084006 | A1* | 4/2013 | Zhang | G06T 7/0081 382/173 |
| 2013/0287292 | A1* | 10/2013 | Ono | G06K 9/00201 382/154 |
| 2013/0342705 | A1 | 12/2013 | Huang et al. | |
| 2014/0056471 | A1* | 2/2014 | Gu | G06K 9/00208 382/103 |
| 2014/0071242 | A1* | 3/2014 | Lin | G06K 9/00201 348/46 |
| 2014/0177915 | A1 | 6/2014 | Fan et al. | |
| 2014/0218483 | A1 | 8/2014 | Wang et al. | |
| 2015/0371398 | A1* | 12/2015 | Qiao | G06T 7/11 382/154 |

* cited by examiner

ILLUMINATION BECOMES
BRIGHTER

LAMP FROM OFF TO ON,
AND FROM OFF TO ON AGAIN

METHOD AND SYSTEM FOR UPDATING BACKGROUND MODEL BASED ON DEPTH

BACKGROUND OF THE INVENTION

1. Field of the Invention

The present invention generally relates to image processing, and specifically, a method and a system for updating a background model based on depth.

2. Description of the Related Art

Background modeling (and subsequent foreground division) is very important in detection and positioning of an object. However, there is interference and disturbance in the process of background modeling. As an important factor, a global or local illumination change, such as (but not limited to) turn-on or turn-off of a lamp for controlling an office area, temporarily covering of a lamp and opening or closing of a curtain, may lead to false foreground pixels. For example, in a case where an illumination condition becomes bright, a region where background modeling is not originally performed may appear as a true background due to illumination increasing. However, the background modeling is not performed for such a region, thus this newly added region may be recognized as foreground pixels incorrectly. Accordingly, the background model is still not correct, and false foreground pixels are recognized incorrectly.

FIG. 1 is a schematic drawing illustrating detected wrong foreground pixels due to a sudden change of illumination situation in the prior art. As illustrated in FIG. 1, a large amount of false foreground pixels occur when illumination becomes bright. An RGB (Red, Green and Blue) image, a depth image and a foreground image on the left side are obtained under a relatively dark illumination condition, and an RGB image, a depth image and a foreground image on the right side are obtained under a relatively bright illumination condition. Most of the pixels in the circle of the drawing on the left do not have a depth value because it is difficult to identify texture on an object surface due to relatively dark illumination; accordingly, depth values of the pixels that cannot be identified are set to 0. After the light becomes bright, a lot of pixels in the circle can be identified and obtain a depth value under a condition of texture enhancement. Thus, for these pixels, a background model constructed under a dark illumination condition cannot match with depth values obtained under a relatively bright illumination condition; accordingly, a lot of false foreground pixels illustrated in the drawing on the right side occur. These false foreground pixels have a negative impact on further detection and tracking.

In fact, some methods of improving background modeling under a condition of illumination changing have been proposed. However, most of these methods is applied to a RGB image and a case where the light changes slowly, and there is no method applied to a depth image and a case where illumination changes rapidly (such as turn-on or turn-off). Therefore, the present invention has an object to solve or mitigate a problem of background modeling of a depth image due to rapid change of illumination.

SUMMARY OF THE INVENTION

According to an aspect of the present invention, a method for updating a background model based on depth includes: receiving, in response to the occurrence of a predetermined background updating condition, one or more depth images captured after a time when the predetermined background updating condition occurs; obtaining, based on an original background model, foreground images in the one or more captured depth images, which are newly added compared with a depth image at the time when the predetermined background updating condition occurs; for each of foreground pixels in each of the newly added foreground images, comparing a current depth value with a previous depth value before the time when the predetermined background updating condition occurs; and updating, when the current depth value is greater than the previous depth value, the original background model as the updated background model by using the foreground pixel in the newly added foreground image.

According to another aspect of the present invention, a system for updating a background model based on depth includes: a reception apparatus configured to receive, in response to the occurrence of a predetermined background updating condition, one or more depth images captured after a time when the predetermined background updating condition occurs; an obtainment apparatus configured to obtain, based on an original background model, foreground images in the one or more captured depth images, which are newly added compared with a depth image at the time when the predetermined background updating condition occurs; a comparison apparatus configured to compare, for each of foreground pixels in each of the newly added foreground images, a current depth value with a previous depth value before the time when the predetermined background updating condition occurs; and an update apparatus configured to update, when the current depth value is greater than the previous depth value, the original background model as the updated background model by using the foreground pixel in the newly added foreground image.

DETAILED DESCRIPTION OF THE PREFERRED EMBODIMENTS

Figure 1:
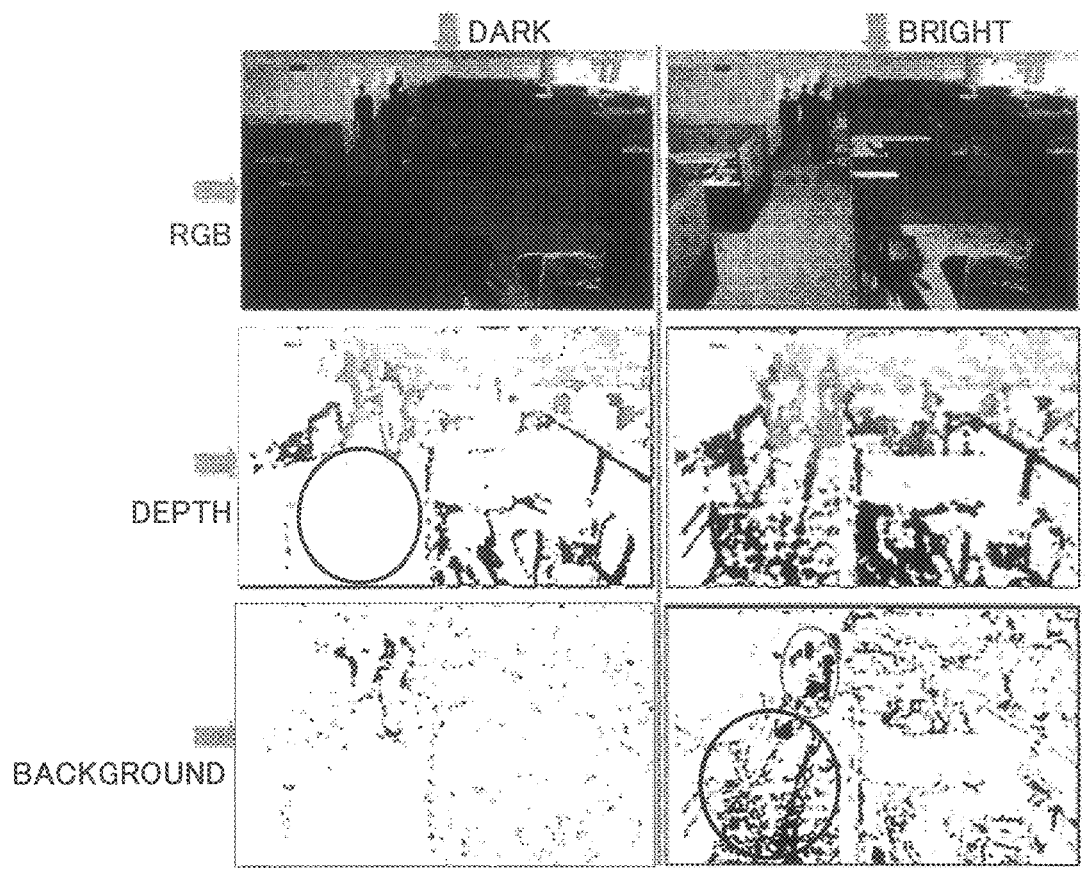
FIG. 1 is a schematic drawing illustrating detected wrong foreground pixels due to a sudden change of illumination situation in the prior art.

In the following, embodiments of the present invention are described in detail with reference to the accompanying drawings, so as to facilitate the understanding of the present invention. It should be understood that, the present invention is not limited to the embodiments, and the scope of the present invention may include various modifications, replacements or combinations. It should be noted that, the steps of the method described here may be implemented by any functional block or functional design, and the functional block or functional design may be implemented as a physical entity, a logical entity or a combination thereof.

In the following, embodiments of the present invention are described in detail with reference to the accompanying drawings, so as to facilitate the understanding of the present invention.

A background modeling method (namely, a foreground division method) is very important for object recognition (type identification) and tracking recovery serving as a final objective, since the background modeling can provide 3D projecting points necessary for detection and tracking of an object. There is disturbance in the modeling process.

Per-pixel background modeling may be divided into a static background modeling method and a dynamic background modeling method. In the static modeling method, a depth image is input, and an average value, i.e., variation (variance) of a depth value at a predetermined pixel is expressed by a single Gaussian model. In the dynamic modeling, a RGB image is input, and change of a depth value at a pixel is expressed by a Multi-Gaussian model. Obviously, in the static background modeling, only one peak value occurs in this model because of limitations of the single Gaussian model, and statistical characteristics of the depth values during a certain period of time are represented. Meanwhile, there are a plurality of Gaussian models in the dynamic background modeling, and linear combination of these Gaussian models represents statistical characteristics of the depth values during a certain period of time.

As the cause of the above problem, depth information has a unique physical distance that does not change in response to illumination change under an ideal situation; however, in actuality, relatively dark illumination may make the texture of a detection object become weak (for example, the contrast of a pixel and local region thereof becomes weak). Accordingly, pixels where the left and right drawings cannot be matched in a disparity search stage become invalid points, and their depth values may be set to 0. The background model constructed by using these depth images (using a method of taking statistics of average value and variance pixel by pixel for many frames of depth images) cannot adapt to newly obtained relatively accurate depth values of the invalid points, which matching between the left and the right can be performed when illumination becomes bright. Thus, a large amount of false foreground points are further produced, and it is difficult to meet the practical application need.

Furthermore, after an original background model is constructed, a moving object (such as a person) of true foreground pixels may exist in the scene. Thus, it is necessary to remove false foreground pixels due to sudden change of illumination, and to retain the true foreground pixels.

Actually, this is not a simple problem of illumination change. Specifically, illumination change is just a trigger factor of this problem. As illustrated in FIG. 1, true foreground pixels are caused by a motion of an object of interest (a person), and the pixels in the circle of the lower-right drawing of FIG. 1 (false foreground pixels) are caused by non-matching between an old model and new data triggered by an illumination condition. Thus, in order to detect an object (a person) in the scene, it is necessary to remove false foreground pixels and retain as many true foreground pixels as possible. Two extreme situations are considered. One is that all of the foreground pixels are removed. In this case, all of the true foreground pixels are removed, although all of the false foreground pixels are removed. The other one is foreground pixels are retained. In this case, all of the false foreground pixels cannot be removed, although all of the true foreground pixels are retained. Thus, this is a paradox.

In order to solve this technical problem, it is necessary to build an adaptive scheme for illumination, by which false foreground pixels can be removed and true foreground pixels caused by object movement can be retained when illumination becomes bright.

Two points are considered to solve this problem.

(1) A predetermined condition is used for triggering an accumulation process to position newly occurring foreground pixels (for example, an illumination detection unit triggers update of the background under an ideal condition only when it is detected that the illumination suddenly becomes bright), and then a background model is always updated pixel by pixel by using current depth value. Two kinds of foreground pixels, that is, true foreground pixels caused by object movement and false foreground pixels caused by illumination change may be generated. For these two kinds of foreground pixels, it is necessary to provide a unified processing method to classify them formally.

(2) A physical principle is considered as follows. For a predetermined pixel position, the depth value of true foreground is always smaller than that of background. Accordingly, at a pixel level, a moving object may expose background pixels and generate relatively large depth values. Thus, the basis of target pixels for updating a background model is provided.

The present invention may be made from following viewpoints based on the idea of the basic concept.

(1) A predetermined condition is detected to trigger an accumulation process of positioning of newly emerging foreground pixels.

(2) A depth comparison is performed for each of pixels to eliminate incorrect model updating, namely, only moving foreground pixels are updated.

Accordingly, a background model constructed under a relatively dark condition can be updated after the illumination condition becomes better. Thus, obviously incorrect foreground pixels do not appear after such a period elapses, and the updated background is robust for rapid change of illumination.

Figure 2:
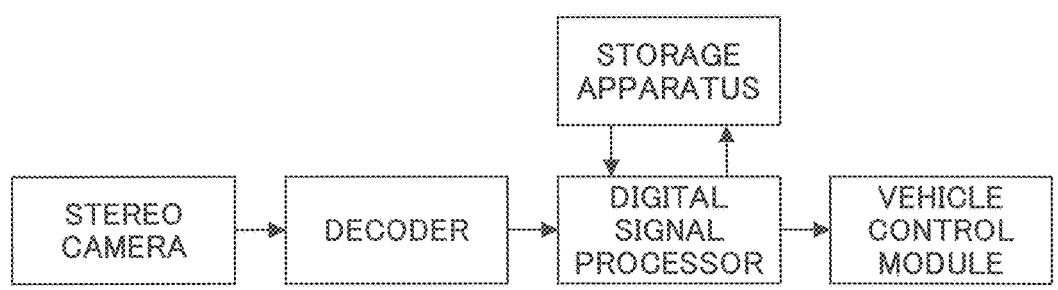
FIG. 2 is a schematic drawing illustrating a hardware environment to which a method of an embodiment of the present invention is applied.

FIG. 2 is a schematic drawing illustrating hardware environment to which a method of an embodiment of the present invention is applied.

As illustrated in FIG. 2, a stereo camera (such as a binocular camera) sends a captured stereo image to a decoder; the decoder decodes the stereo image and converts it into any required images, such as disparity maps (namely, depth images), grayscale images or the like; a digital signal processor receives a target image (including but not being limited to a disparity map or a grayscale image) as an input image, and performs interactive processing together with a storage apparatus to output an updated background model and other relevant data to a vehicle control module; and the vehicle control module performs control of a vehicle, such as foreground detection, pedestrian recognition, vehicle recognition, road recognition, automatic driving or the like, based on a detected target and other relevant data. The digital signal processor may be connected to an input apparatus (the binocular camera or the decoder), an output apparatus (the vehicle control module) and the storage apparatus. The method provided by the present disclosure may be performed in the digital signal processor.

Figure 3:
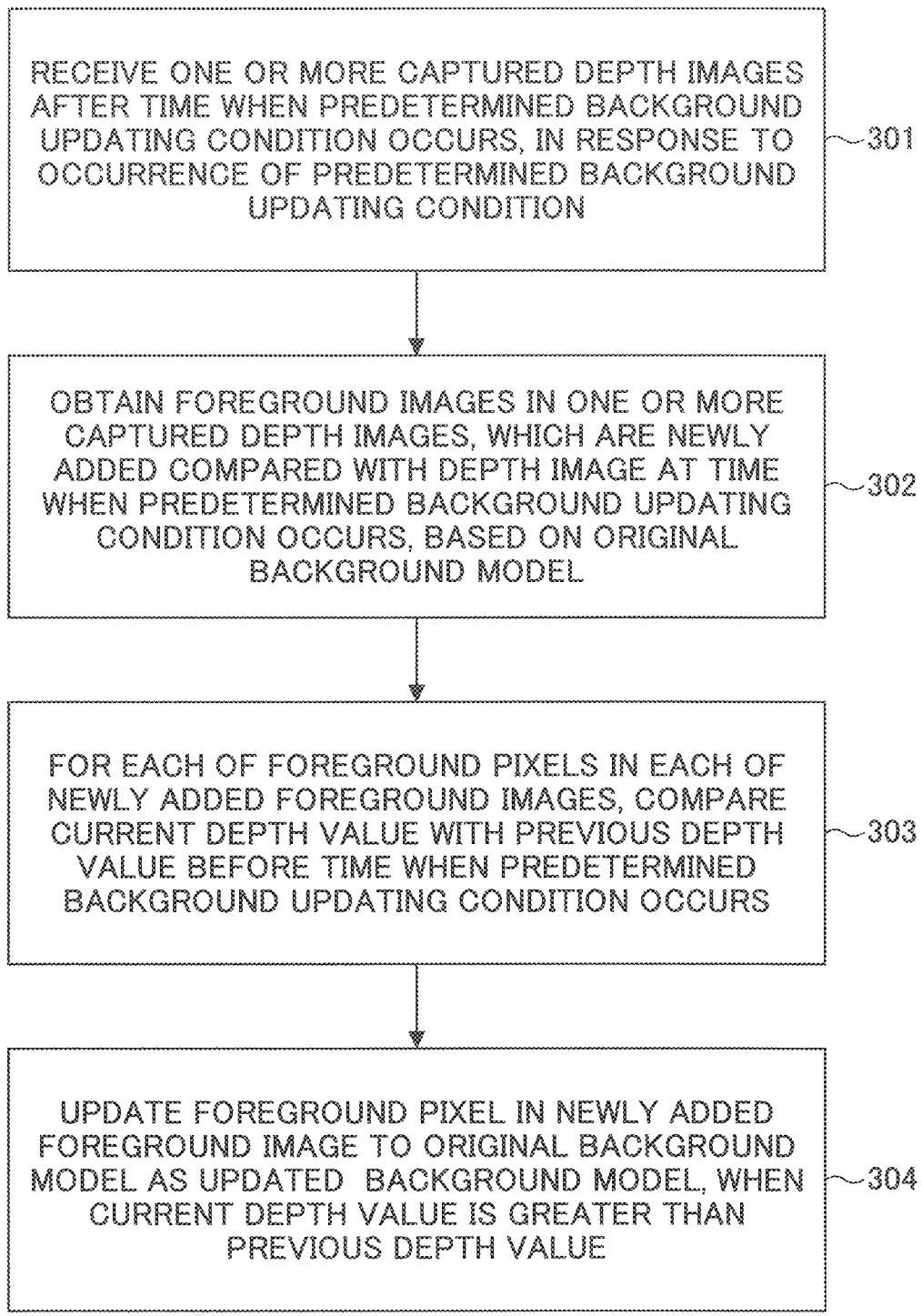
FIG. 3 is a flowchart illustrating a method for updating a background model based on depth according to an embodiment of the present invention.

FIG. 3 is a flowchart illustrating a method for updating a background model based on depth according to an embodiment of the present invention.

As illustrated in FIG. 3, the method for updating a background model based on depth includes: step 301, receiving, in response to the occurrence of a predetermined background updating condition, one or more depth images captured after a time when the predetermined background updating condition occurs; step 302, obtaining, based on an original background model, foreground images in the one or more captured depth images, which are newly added compared with a depth image at the time when the predetermined background updating condition occurs; step 303, for each of foreground pixels in each of the newly added foreground images, comparing a current depth value with a previous depth value before the time when the predetermined background updating condition occurs; and step 304, updating, when the current depth value is greater than the previous depth value, the original background model as the updated background model by using the foreground pixel in the newly added foreground image.

In this way, the original background model can be updated as the updated background using the foreground pixels whose the depth value is greater than an original depth value, by comparing the depth values of the foreground pixels in the newly added foreground image with the original depth value, after the predetermined background updating condition Occurs. Thus, the background model can be adaptively updated.

In an embodiment, whether the predetermined background updating condition occurs may be determined based on at least one of the conditions: whether an increasing amount or an increasing rate of environment brightness is greater than a predetermined threshold, whether a change amount or a change rate of environment brightness is greater than a predetermined threshold, and whether a predetermined period has elapsed. For example, when the illumination condition suddenly becomes bright, namely, the increasing amount or the increasing rate of brightness is greater than the predetermined threshold, a true background appears because the illumination condition becomes better. However, the newly added region may be recognized as foreground pixels incorrectly since the background model is not constructed for this region; accordingly, the background model is still incorrect and false foreground pixels are recognized incorrectly. Thus, the background updating method according to the embodiment of the present invention may be performed at this time. It should be noted that, as a starting condition of triggering of the background updating, the condition that the illumination condition becomes better is just an example; other triggering conditions, such as regular updating, periodic updating or obtainment of an illumination control signal may also be applied to the updating of the background model, but the present invention is not limited to the above triggering condition.

Additionally, after the background model is updated one time, the updating may be not performed when the illumination condition suddenly becomes bright again, since the previous updating has already reached appropriate effect. That is to say, the number of times of updating the background model may be set to 1. It should be noted that, the number of times of updating the background model may also be set to another value, or the background may be updated at each time when the illumination condition becomes bright.

In an embodiment, depth values of unmodeling pixels in the original background model may be set to 0. In a case where illumination condition is dark, it is difficult to identify the texture of a surface of an object because of weak illumination (namely, left and right images captured by a stereo camera are not matched); accordingly, the depth values of these pixels that cannot be identified are set to 0, namely, these pixels do not have depth value. It should be noted that, the depth values of these pixels that cannot be identified may also be set to other values to represent that a background model is not constructed for these pixels.

In an embodiment, obtaining, based on the original background model, the foreground images in the one or more captured depth images, which are newly added compared with the depth image at the time when the predetermined background updating condition occurs (step 302) may include: obtaining, based on the original background model, a first foreground image in the depth image captured at the time when the predetermined background updating condition occurs; obtaining, based on the original background model, second foreground images in the one or more depth images captured after a time when the predetermined background updating condition occurs; performing subtraction between each of the second foreground images and the first foreground image; setting newly added foreground images in the one or more captured depth images obtained by the subtraction as the newly added foreground images; and omitting a vanishing foreground image and a cancelled foreground image in the depth images obtained by the subtraction.

Foreground pixels that change compared with an original depth image can be obtained by performing subtraction between the one or more captured depth images and the depth image captured before the time when the predetermined background updating condition occurs. If the obtained pixel is positive, the obtained pixel may be regarded as a newly added foreground pixel; if the obtained pixel is negative, the obtained pixel may be regarded as a vanishing foreground pixel; and if the obtained pixel is cancelled, namely the obtained pixel is 0, the obtained pixel may be regarded as a position without change. Thus, the vanishing foreground pixels and the cancelled foreground pixels may not be considered, because all of these foreground pixels are not the background newly added due to the change of the illumination condition. In this way, the comparison of the depth values is performed only for the newly added foreground pixels that are the true background, thus computational cost and time can be reduced and operation speed can be accelerated.

In an embodiment, wherein updating, when the current depth value is greater than the previous depth value, the original background model as the updated background model by using the foreground pixel in the newly added foreground image includes: updating the original background model as the updated background model by using a position and a depth value of the foreground pixel in the newly added foreground image. Generally, a new background model may be obtained by updating the position and the depth value of a pixel, however a grayscale value and a RGB value may also be used for updating to identify the background better.

In this way, the background model can be adaptively updated when the predetermined background updating condition occurs, thus a more accurate background model can be constantly obtained.

In the following, a detailed example of background model updating may be described with reference to the accompanying drawings. It should be noted that, FIG. 4 and subsequent drawings are just a detailed example, and the embodiment of the present invention is not limited to the following detailed steps, values, conditions, data, order, etc. Other embodiments unmentioned in the present specification may be made by persons skilled in the art by reading the present specification and utilizing the idea of the present invention.

Figure 4:
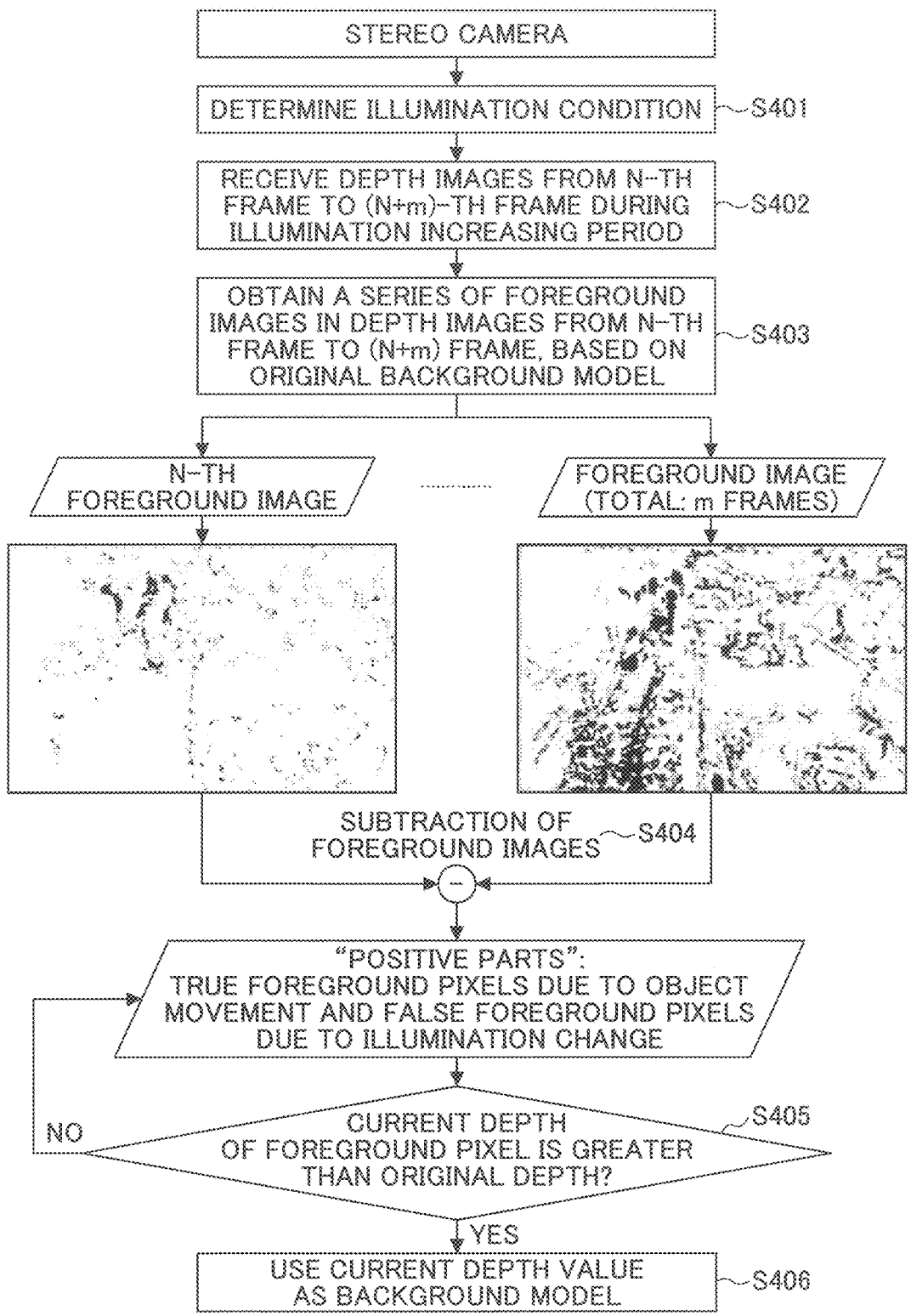
FIG. 4 is a flowchart illustrating a method for updating a background model based on depth according to another embodiment of the present invention.

FIG. 4 is a flowchart illustrating a method for updating a background model based on depth according to another embodiment of the present invention.

The method illustrated in FIG. 4 includes: S401, determining an illumination condition; S402, receiving depth images from N-th frame to (N+m)-th frame (N and m are positive integers) during an illumination increasing period; S403, obtaining a series of foreground images in depth images from N-th frame to (N+m)-th frame, based on an original background model; S404, subtracting the foreground image of N-th frame from each of the foreground images from (N+1)-th frame to (N+m)-th frame to position newly appearing foreground pixels in each of the m frames, respectively, that including true foreground image and false foreground image due to the change of the illumination; S405, determining whether a current depth value of the newly added foreground pixel is greater than an original depth value for each of the pixels, and if the current depth value is greater than the original depth value, the process proceeds to step S406, and if the current depth value is not greater than the original depth value, the process returns to the next pixel to be determined; S406, using the current depth value as the updated background model to remove incorrect models and update the model only by true foreground pixels due to movement.

Figure 5:
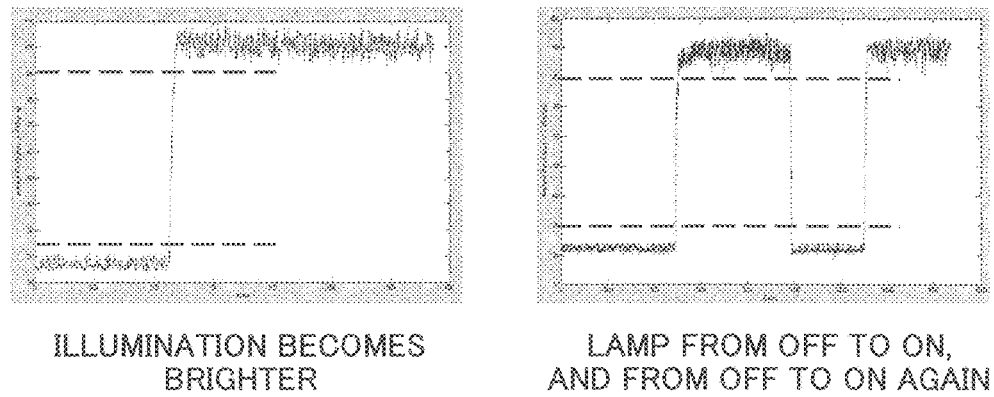
FIG. 5 is a schematic drawing illustrating brightness increasing due to change of an illumination condition.

In step S401, in determining the illumination condition, if rapid enhancement of illumination is detected as illustrated in the left drawing of FIG. 5 (FIG. 5 is a schematic drawing illustrating brightness increasing of change of an illumination condition), this may be regarded as the predetermined background updating condition to start the process of the background updating.

For example, an RGB image may be converted into a YUV (or YCbCr, Luminance-Chrominance) space, a Y channel representing a brightness component. Thus, rapid enhancement of illumination can be determined by detecting a sharp rise of the Y brightness component (the left drawing of FIG. 5), and the rapid enhancement of illumination can be regarded as a trigger condition. During an illumination enhancement period, a model of each of the pixels is updated by the current depth value. The right drawing of FIG. 5 illustrates a curve of illumination change in a room, in which three operations, turn-on, turn-off and turn-on again of a lamp are included.

It should be noted that, after the background model is updated one time, the updating may be not performed when the illumination condition suddenly becomes bright again (the updating is not performed when the lamp is turned on again after it is turned off as illustrated in the right drawing of FIG. 5, namely, the light is enhanced for the second time); this is because the previous updating has already reached appropriate effect. That is to say, the number of times of updating the background model may be set to 1. It should be noted that, the number of times of updating the background model may also be set to another value, or the background may be updated at each time when the illumination condition becomes bright.

Next, when a detection unit detects a rapid enhancement of illumination (as illustrated in the left drawing of FIG. 5) at the N-th frame, the detection unit triggers the following accumulation to update the background model. For example, when an event of illumination enhancement is detected at the N-th frame, the N-th frame may be regarded as reference. Namely, the next m frames are received (step S402). Next, for the received m frames (from the (N+1)-th frame to the (N+m)-th frame), foreground images based on an original background model are calculated (step S403) and the foreground image based on the original background model at the N-th frame reference is subtracted from the foreground images of the m frames, so that newly added foreground pixels at each of the m frames are obtained (namely, the foreground pixels whose the subtraction result is positive are obtained, and the foreground pixels whose the subtraction result is 0 or negative are ignored) (step S404). In this way, a difference between a foreground mask under a relatively bright illumination condition and a foreground mask under a relatively dark illumination condition is saved as primary information of an update position (or region), so that the depth value that appears when illumination becomes bright is fully utilized. In this way, "positive parts" (namely, the foreground pixels whose the subtraction result is positive) can be obtained; that is to say, the difference between the foreground mask under the relatively bright illumination condition and the foreground mask under the relatively dark illumination condition is saved as the primary information of the update position (or region), even though the update position (or region) includes both true foreground pixels due to object movement and false foreground pixels due to illumination change. According to the embodiment, this information is saved, namely, difference of frames are accumulated on a special image (called a "positive parts image"). The reason why it is called "positive parts" is because a pixel corresponding to 1 in the foreground mask under a relatively bright illumination condition and a pixel corresponding to 0 in the foreground mask under a relatively dark illumination condition are recorded as positive in a final accumulation image (1−0=1), and non-positive values are obtained in other cases (for example, 1−1=0, 0−0=0 and 0−1=−1) and ignored in the final accumulation image. In this process, when the accumulation is performed for each of the pixels, depth values in the current "mask image" (not the whole image) of "positive parts" under relatively bright illumination are used for updating the original background model, so that a smooth updating can be ensured. In this way, more reliable depth data under a bright illumination condition can be fully utilized.

Figure 6:
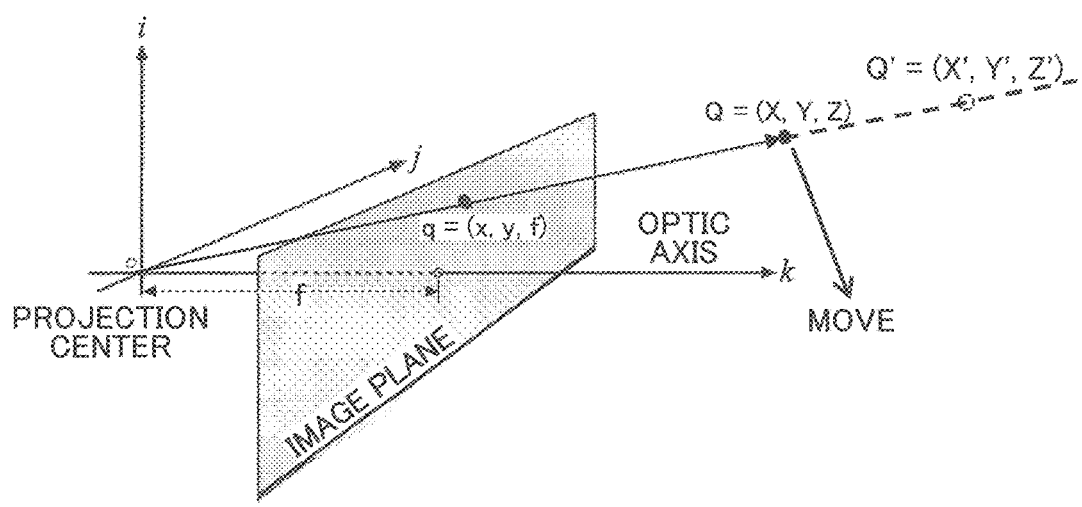
FIG. 6 is a schematic drawing illustrating a relationship between true foreground depth and true background depth.

For a given pixel position, true foreground depth is generally smaller than true background depth. For example, as illustrated in FIG. 6 (FIG. 6 is a schematic drawing illustrating a relationship between true foreground depth and true background depth), along the same projection line, the background point Q' is always blocked by the foreground point Q, thus an image point (q) of Q rather than Q' is generated on the image plane. It should be noted that, if Q moves to a position behind Q' and is still located on the projection line, Q will be blocked by Q' and is no longer visible. At this time, an image of Q' appears on the image plane. This is the principle for providing candidate pixels to update the background model; at the pixel level, movement of an object may expose true background pixels, thus a depth value greater than an original depth value may be generated. As illustrated by the arrow and the indication word "move", the foreground object Q moves along the direction shown by the arrow, and the background Q' appears. At this time, if the depth value Z' at this pixel position and the original depth value Z are compared (step S405), it may be found that the depth value Z' at this pixel position is greater than the original depth value Z. Accordingly, it may be determined that this pixel at position Q' is a background pixel, and the background model may be updated by this pixel, so that a more accurate background model is obtained (step S406).

Figure 7:
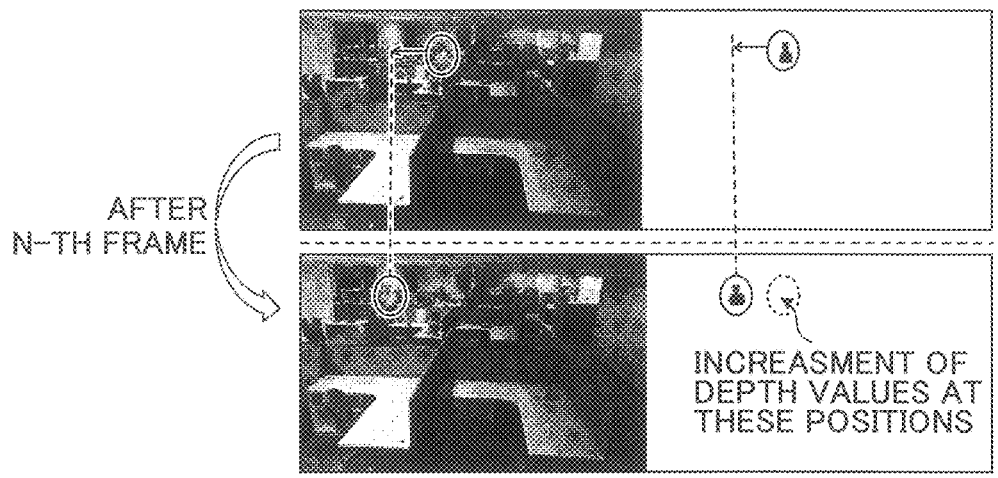
FIG. 7 is a schematic drawing illustrating increasing of depth values of pixels after the illumination condition changes.

FIG. 7 is a schematic drawing illustrating increasing of depth values of pixels after the illumination condition changes. Erroneous model updating is removed by performing comparison for each pixel, and the background model is updated by true moving foreground pixels. In a camera coordinate system, if a position of an object changes to a new position after N frames, the depth values of the pixels at the original positions of the object will increase. This is because the true background pixels at these positions are not blocked by the original foreground but are exposed. It should be noted that, it is a process of gradual accumulation of motion shift to make this process perform more smoothly. As an example, the simplest policy is to use an obtained maximum depth value.

$$\text{Background(current)} = \max(\text{depth}\{N, N+1, \ldots, \text{Current}\}) \quad (1)$$

Background(current) is a background model expressed by depth values, depth(x) represents a depth value of x frames (x∈[N,N+m]) and is obtained by calculating a maximum depth value from N-th frame to a current frame (namely, a frame of m frames). It should be noted that, besides the above formula, other policies (for example, for a pixel, an updating time when the depth values are compared and the background model is updated) may be used. That is to say, in the embodiment, in the m frames after the time when the background updating condition occurs, only the maximum depth value is used as the depth value for updating the background (because the background usually is the deepest). However, it is just an example. Actually, only the depth value of the foreground pixels of the m-th frame (namely, the last frame) may be used, or only an average value of the depth values of the foreground pixels in m frames may be used as the depth values for updating the background. Of course, various designs may be performed based on accuracy and reliability of updating of the background model to be realized.

Moreover, a moving direction and speed of a foreground object in a space when the predetermined background updating condition occurs may be considered. Specifically, if the moving direction and the speed are different from a direction and a speed for exposing the background in the usual case, it may be not considered that the background model is updated by using the depth values of the foreground object; and if the moving direction and the speed are the same as the direction and the speed for exposing the background in the usual case, it may be considered that the background model is updated by using the depth values of the foreground object. In this way, some situations in which the background is not exposed can be removed, and erroneous background model updating can be removed.

Figure 8:
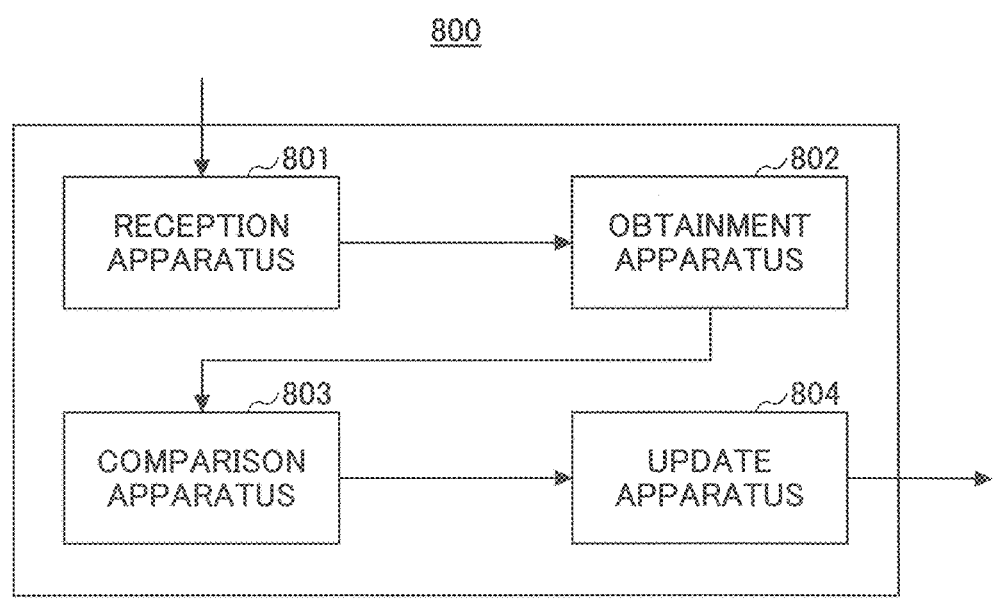
FIG. 8 is a block diagram illustrating a system for updating a background model based on depth according to an embodiment of the present invention.

FIG. 8 is a block diagram illustrating a system for updating a background model based on depth according to an embodiment of the present invention.

The system for updating a background model based on depth 800 illustrated in FIG. 8 includes: a reception apparatus 801 configured to receive, in response to the occurrence of a predetermined background updating condition, one or more depth images captured after a time when the predetermined background updating condition occurs; an obtainment apparatus 802 configured to obtain, based on an original background model, foreground images in the one or more captured depth images, which are newly added compared with a depth image at the time when the predetermined background updating condition occurs; a comparison apparatus 803 configured to compare, for each of foreground pixels in each of the newly added foreground images, a current depth value with a previous depth value before the time when the predetermined background updating condition occurs; and an update apparatus 804 configured to update, when the current depth value is greater than the previous depth value, the original background model as the updated background model by using the foreground pixel in the newly added foreground image.

In this way, the original background model can be updated as the updated background using the foreground pixels whose the depth value is greater than an original depth value, by comparing the depth values of the foreground pixels in the newly added foreground image with the original depth value, after the predetermined background updating condition occurs. Thus, the background mode can be adaptively updated.

In an embodiment, whether the predetermined background updating condition occurs may be determined based on at least one of the conditions: whether an increasing amount or an increasing rate of environment brightness is greater than a predetermined threshold, whether a change amount or a change rate of environment brightness is greater than a predetermined threshold, and whether a predetermined period has elapsed. For example, when the illumination condition suddenly becomes bright, namely, the increasing amount or the increasing rate of brightness is greater than the predetermined threshold, a true background appears because the illumination condition becomes better. However, the newly added region may be recognized as foreground pixels incorrectly since the background model is not constructed for this region; accordingly, the background model is still incorrect and false foreground pixels are recognized incorrectly. Thus, the background updating method according to the embodiment of the present invention may be performed at this time. It should be noted that, as a starting condition of triggering the background updating, the condition that the illumination condition becomes better is just an example; other triggering conditions, such as regular updating, periodic updating or obtainment of an illumination control signal may also be applied to the updating of the background model, but the present invention is not limited to the above triggering condition.

Additionally, after the background model is updated one time, the updating may be not performed when the illumination condition suddenly becomes bright again, since the previous updating has already reached appropriate effect. That is to say, the number of times of updating the background model may be set to 1. It should be noted that, the number of times of updating the background model may also be set to another value, or the background may be updated at each time when the illumination condition becomes bright.

In an embodiment, depth values of unmodeled pixels in the original background model may be set to 0. In a case where illumination condition is dark, it is difficult to identify the texture of a surface of an object because of weak illumination (namely, left and right images captured by a stereo camera are not matched); accordingly, the depth values of these pixels that cannot be identified are set to 0, namely, these pixels do not have depth value. It should be noted that, the depth values of these pixels that cannot be identified may also be set to other values to represent that a background model is not constructed for these pixels.

In an embodiment, the obtainment apparatus 802 may obtain, based on the original background model, a first foreground image in the depth image captured at the time when the predetermined background updating condition occurs; obtain, based on the original background model, second foreground images in the one or more depth images captured after a time when the predetermined background updating condition occurs; perform subtraction between each of the second foreground images and the first foreground image; set newly added foreground images in the one or more captured depth images obtained by the subtraction as the newly added foreground images; and omit a vanishing foreground image and a cancelled foreground image in the depth images obtained by the subtraction.

Foreground pixels that change compared with an original depth image can be obtained by performing subtraction between the one or more captured depth images and the depth image captured before the time when the predetermined background updating condition occurs. If the obtained pixel is positive, the obtained pixel may be regarded as a newly added foreground pixel; if the obtained pixel is negative, the obtained pixel may be regarded as a vanishing foreground pixel; and if the obtained pixel is cancelled, namely the obtained pixel is 0, the obtained pixel may be regarded as a position without change. Thus, the vanishing foreground pixels and the cancelled foreground pixels may not be considered, because all of these foreground pixels are not the background newly added due to the change of the illumination condition. In this way, the comparison of the depth values is performed only for the newly added foreground pixels that are the true background, thus computational cost and time can be reduced and operation speed can be accelerated.

In an embodiment, wherein updating, when the current depth value is greater than the previous depth value, the original background model as the updated background model by using the foreground pixel in the newly added foreground image includes: updating the original background model as the updated background model by using a position and a depth value of the foreground pixel in the newly added foreground image. Generally, a new background model may be obtained by updating the position and the depth value of a pixel, however a grayscale value and a RGB value may also be used for updating to identify the background better.

In this way, the background model can be adaptively updated when the predetermined background updating condition occurs, thus a more accurate background model can be constantly obtained.

According to the embodiments of the present invention, the updating of the background model can be adaptively started when the determined background updating condition occurs, thus a more accurate background model can be obtained. In order to measure the accuracy, three technical indicators are defined.

Technical Indicator 1: SNR=signal/noise, which represents the significance of the foreground signal with respect to the noise.

Technical indicator 2: Hit Rate=signal/true signal, which represents the storage capability for true foreground information.

Technical indicator 3: operating time, which represents the real-time performance of the system.

As proved by experiments, according to the embodiments of the present invention, SNR can be increased, an acceptable Hit Rate can be maintained and little time is consumed. For example, as shown in data of an experiment, generally, according to the embodiments of the present invention, SNR can be increased five times and HitRate can be maintained at 80% of the original HitRate.

It should be noted that, the above specific embodiments are just examples and the present invention is not limited to those embodiments. The embodiments may be combined or some steps or apparatuses may be merged according to the embodiments by persons skilled in the art according to the concept of the present invention to realize the effect of the present invention, and the combined embodiments and the merged embodiments are included within the present invention. The description of the combination and merging is omitted here.

It should be noted that, the advantage or effect of the present invention is described above. The above descriptions of the embodiments are just examples, and various modifications, replacements or combinations may be made without departing from the scope of the present invention by persons skilled in the art.

The block diagrams of the units, apparatuses, devices and system are just examples, the connection, placement and configuration illustrated in the block diagrams related to the present invention are not limited to these examples, and the units, apparatuses, devices and system may be connected, placed or configured in any way. The terms "comprise", "include" and "have" are open-form terms, which mean and may be changed into "include and is not limited to". The terms "or" and "and" mean and may be changed into "and/or", unless the context is clearly not. The term "such as" means and may be changed to "such as, but not limited to".

The flowchart and the method according to the present invention are just examples, and not limited to the steps in the embodiments. The steps of the embodiments may be performed in any order. The terms "next", "subsequently" and "then" are just for describing the present invention, and the present invention is not limited to these terms. Furthermore, the articles "a", "an" and "the" should not be limited to the singular element.

The steps or apparatuses of the present invention are described above. The above descriptions of the embodiments are just examples, and various modifications, replacements or combinations may be made without departing from the scope of the present invention by persons skilled in the art.

The steps of the above method may be performed by any appropriate means that can perform the corresponding functions. The means may include any components and/or modules of hardware and/or software, and include but not be limited to a circuit, a dedicated application-specific integrated circuit (ASIC) or a processor.

The present invention may use a general-purpose processor, a digital signal processor (DSP), an ASIC, a field programmable gate array (FPGA) or other programmable logic device (PLD), a discrete gate or transistor logic, discrete hardware components or any other combination for executing the functions to realize the logic blocks, modules and circuits of the embodiments. The general-purpose processor is a micro-processor, and alternatively, the processor may be any processors, controllers, micro-controllers or state machines that can be obtained commercially. The processor may also be the combination of the computer equipment, such as the combination of a DSP and a micro-processor, the combination of plural micro-processors, or the combination of a DSP and plural micro-processors.

The steps of the method according to the present invention may be incorporated in the hardware, software modules executed by a processor or the combination of these two directly. The software modules may be stored in a recording medium with any shape. The examples of the recording medium includes a random access memory (RAM), a read-only memory (ROM), a flash memory, an EPROM memory, an EEPROM memory, a register, a hard disk drive, a removable disk, a CD-ROM, etc. The recording medium may be linked to a processor so that the processor reads information from the recording medium or writes information into the recording medium. Alternatively, the recording medium and the processor may also be a whole apparatus. The software module may be a single command or many commands, and may be distributed in several code segments, different programs or plural recording media.

Steps of the above method may be performed in time order, however the performing sequence is not limited to the time order. Any steps may be performed in parallel or independently.

The functions may be realized by hardware, software, firmware or any combination thereof. When the function is implemented by software, the function may be stored in a computer-readable medium as one or more commands. The recording medium may be any real medium that can be accessed by a computer. Such a computer-readable medium includes a RAM, a ROM, an EEPROM, a CD-ROM or other laser discs, a magnetic disk or other magnetic memory, or any other real media that carry or store commands, data or program codes and are accessed by the computer. Such disk and disc include a CD, a laser disc, an optical disc, a DVD disc, a floppy disk and a blue-ray disc, and the disk usually reproduces data and the disc reproduces data by a laser.

Thus, the operations may be performed by a computer program product. For example, such computer program product may be a tangible medium where computer-readable commands are stored (or coded), and the commands may be executed by one or more processors to perform the operation. The computer program product may include packaging material.

The software or commands may also be transmitted by a transmission medium. For example, a coaxial cable, an optical cable, a twisted cable, a digital subscriber line (DSL), or a transmission medium of the wireless technology of infrared, wireless or microwave may be used to transmit the software from a website, a server or another remote source.

Additionally, the modules and/or other appropriate means of the method or technology may be obtained from a user terminal and/or base station, or by other methods. For example, such equipment may be connected to a server so as to perform the transmission of the means of the above method. Alternatively, the methods may be provided via a storage unit (for example, a physical storage medium such as a RAM, a ROM, a CD or a floppy disc), so that the user terminal and/or the base station can obtain the methods when it is connected to the equipment. Furthermore, any other appropriate technology may be provided to the equipment by the method.

The present specification and the appended claims includes other examples and implementations. For example, the above functions may be implemented by a processor, hardware, software, firmware, hard-wire or any combination thereof. The features for implementing the functions may be located at any physical position where which is distributed to each position physically. Furthermore, the term "or" before the term "at least one" means a separate enumerating, and for example, "at least one of A, B or C" means (1) A, B or C, (2) AB, AC or BC, or (3) ABC (namely, A and B and C). Additionally, the term "example" does not mean a preferable example or an example superior to other examples.

Various modifications, replacements or combinations may be made without departing from the scope of the present invention by persons skilled in the art. Furthermore, the scope of the present specification and the claims are not limited to the above processing, machine, manufacture, composition of events, means, method and operation. The processing, machine, manufacture, composition of events, means, method and operation with a similar function or a similar result may also be applied to the present invention. Therefore, the scope of the appended claims include such processing, machine, manufacture, composition of events, means, method and operation.

The purposes of the present invention is described above. The above descriptions of the embodiments are just examples, and various modifications, replacements or combinations may be made without departing from the scope of the present invention by persons skilled in the art.

The basic principle of the present invention is described above with reference to the embodiments, however the present invention is not limited to the principle.

The present application is based on and claims the benefit of priority of Chinese Priority Application No. 201410283056.2 filed on Jun. 23, 2014, the entire contents of which are hereby incorporated by reference.

What is claimed is:

1. A method for updating a background model based on depth, the method comprising:

receiving, in response to the occurrence of a predetermined background updating condition, one or more depth images captured after a time when the predetermined background updating condition occurs;

obtaining, based on an original background model, foreground images in the one or more captured depth images, which are newly added compared with a depth image at the time when the predetermined background updating condition occurs;

for each of foreground pixels in each of the newly added foreground images, comparing a current depth value with a previous depth value before the time when the predetermined background updating condition occurs; and updating, when the current depth value is greater than the previous depth value, the original background model as the updated background model by using the foreground pixel in the newly added foreground image, wherein whether the predetermine background updating condition occurs is determined based on at least one of:

whether an increasing amount or an increasing rate of environment brightness is greater than a predetermined threshold, whether a change amount or a change rate of environment brightness is greater than a predetermined threshold, and whether a predetermined period has elapsed, and wherein the obtaining, based on the original background model, the foreground images in the one or more captured depth images, which are newly added compared with the depth image at the time when the predetermined background updating condition occurs includes:

obtaining, based on the original background model, a first foreground image in the depth image captured at the time when the predetermined background updating condition occurs;

obtaining, based on the original background model, second foreground images in the one or more depth images captured after a time when the predetermined background updating condition occurs;

performing subtraction between each of the second foreground images and the first foreground image;

setting newly added foreground images in the one or more captured depth images obtained by the subtraction as the newly added foreground images; and omitting a vanishing foreground image and a cancelled foreground image in the depth images obtained by the subtraction.

2. The method for updating a background model according to claim 1,
wherein depth values of unmodeling pixels in the original background model are set to 0.

3. The method for updating a background model according to claim 1, wherein the updating, when the current depth value is greater than the previous depth value, the original background model as the updated background model by using the foreground pixel in the newly added foreground image includes:
updating the original background model as the updated background model by using a position and a depth value of the foreground pixel in the newly added foreground image.

4. The method for updating a background model according to claim 1, wherein the number of times of the updating the background model is set to a positive integer.

5. the method for updating a background model according to claim 1, wherein the environment brightness is obtained from a brightness value obtained by converting a currently captured depth image into a luminance-chrominance space.

6. A system for updating a background model based on depth, the system comprising:
processing circuitry configured to receive, in response to the occurrence of a predetermined background updating condition, one or more depth images captured after a time when the predetermined background updating condition occurs;

processing circuitry configured to obtain, based on an original background model, foreground images in the one or more captured depth images, which are newly added compared with a depth image at the time when the predetermined background updating condition occurs;

processing circuitry configured to compare, for each of foreground pixels in each of the newly added foreground images, a current depth value with a previous depth value before the time when the predetermined background updating condition occurs; and processing circuitry configured to update, when the current depth value is greater than the previous depth value, the original background model as the updated background model by using the foreground pixel in the newly added foreground image, wherein whether the predetermine background updating condition occurs is determined based on at least one of:

whether an increasing amount or an increasing rate of environment brightness is greater than a predetermined threshold, whether a change amount or a change rate of environment brightness is greater than a predetermined threshold, and whether a predetermined period has elapsed, wherein the processing circuitry configured to obtain is further configured to:

obtain, based on the original background model, a first foreground image in the depth image captured at the time when the predetermined background updating condition occurs;

obtain, based on the original background model, second foreground images in the one or more depth images captured after a time when the predetermined background updating condition occurs;

perform subtraction between each of the second foreground images and the first foreground image;

set newly added foreground images in the one or more captured depth images obtained by the subtraction as the newly added foreground images; and omit a vanishing foreground image and a cancelled foreground image in the depth images obtained by the subtraction.

7. The system for updating a background model according to claim 6,
wherein depth values of unmodeling pixels in the original background model are set to 0.

8. The system for updating a background model according to claim 6, wherein the update processing circuitry is further configured to:
update the original background model as the updated background model by using a position and a depth value of the foreground pixel in the newly added foreground image.

9. The system for updating a background model according to claim 6,
wherein the number of times of updating the background model is set to a positive integer.

10. The system for updating a background model according to claim 6, wherein the environment brightness is obtained from a brightness value obtained by converting a currently captured depth image into a luminance-chrominance space.

* * * * *